April 4, 1961  R. E. LINDBERG  2,977,789
HEAT EXCHANGE TEST JIG
Filed May 15, 1958
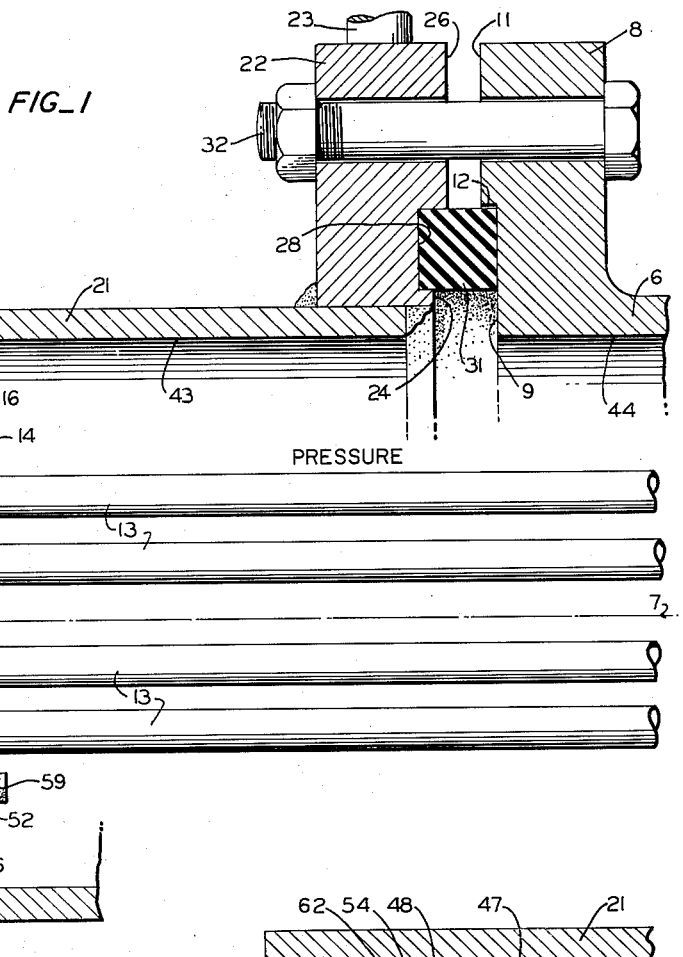
FIG_1
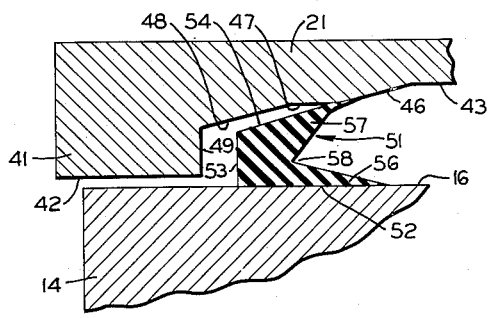
FIG_2
FIG_3
INVENTOR.
RAMON E. LINDBERG
BY *Lothrop & West*
ATTORNEYS

United States Patent Office 2,977,789
Patented Apr. 4, 1961

2,977,789
HEAT EXCHANGE TEST JIG
Ramon E. Lindberg, Concord, Calif., assignor to Yuba Consolidated Industries, Inc., a corporation
Filed May 15, 1958, Ser. No. 735,590
4 Claims. (Cl. 73—40)

My invention relates particularly to means for use especially in the factory and field testing of heat exchangers particularly of the type in which the outer shell has an end flange normally closed by a flanged and domed cover and also having interior tubes terminating in a floating or axially movable tube sheet which is outstanding from the shell end flange and is in use disposed within the domed cover. It is customary to submit finished heat exchangers (which in some uses are subject to relatively high pressures) to a hydrostatic test. In the event the test indicates a leak, it is impossible to determine where within the interior of the structure the leak is. It is necessary to dismantle the end cover after returning to atmospheric pressure and dewatering. The defective location may be very hard to find, particularly if the leak is fugitive and occurs only under high pressure. Perhaps several tests are necessary before the difficulty is located. Even in small heat exchangers this is annoying, but in large heat exchangers, especially those adapted to operate under relatively high pressures, the mechanism that must be assembled and disassembled is cumbersome and the test and repair procedure is awkward and protracted and expensive.

It is therefore an object of my invention to provide a heat exchanger test jig with which the test can be effectuated with the tubes and tube sheet exposed so that any leakage between any tube and the tube sheet is readily observed and can readily be repaired.

Another object of the invention is to provide a heat exchanger test jig useful not only in the initial fabricating and testing plant, but also readily useful in the field by ordinary field labor and with ordinary field equipment.

Another object of the invention is to provide a heat exchanger test jig readily accommodated to different heat exchangers of the same nominal size even though they vary somewhat in individual dimensions and finish.

A still further object of the invention is to provide a heat exchanger test jig continuously effective despite distortions in or movements of the heat exchanger during the test procedure.

An additional object of the invention is to provide a test jig readily handled and easily stored or shipped between uses without likelihood of substantial damage to any of the important parts.

A further object of the invention is in general to provide an improved test jig especially for use with heat exchangers.

Other objects, together with the foregoing, are attained in the embodiment of the invention described in the accompanying description and illustrated in the accompanying drawings in which:

Figure 1 is a view of an end portion of a heat exchanger with the test jig pursuant to the invention mounted thereon in testing position, the view being a cross section in an axial plane;

Figure 2 is an enlarged detail of the structure shown in Figure 1, with certain portions being broken away and indicating a partial assembly;

Figure 3 is a view similar to Figure 2 but showing the parts in positions closer to, but not quite in fully assembled condition.

The test jig of the invention can be incorporated in a number of different ways especially depending upon the particular environment in which it is to be utilized and has been successfully embodied in a commercial form as illustrated herein. In this environment there is provided for test a heat exchanger including a shell 6. This is a circular cylindrical member symmetrical about a longitudinal axis 7 and is assumed to be closed at the remote end, not shown. At the illustrated end, the shell 6 terminates in a shell flange 8 outstanding from the general body of the heat exchanger and finished in a radially inner planar face 9 normal to the axis 7 and a radially outer, displaced planar face 11 also normal to the axis and leaving an intermediate annular shoulder 12.

Disposed within the shell 6 and usually arranged symmetrically with and parallel to the axis 7 are heat exchanger tubes 13 at one end (not shown) appropriately mounted or fixed within the shell 6 and at the illustrated end terminating in a tube sheet 14. In the usual design, the tubes are firmly seated in the tube sheet, the intention being to make the inter-connections leakproof. When the pressure to which the device is to be subjected is relatively high, the tube sheet 14 is made relatively thick and so has a peripheral, cylindrical surface 16 approximately concentric with the axis 7.

The arrangement is such that as the various members of the heat exchanger vary in temperature from time to time and are subjected to different pressures, the tubes 13 expand and contract in length so that the tube sheet 14 similarly moves to and fro along the axis 7. In addition, there are other, sometimes random forces tending to twist or cock the tube sheet 14 and even to displace it in a direction with a component normal to the axis 7. While the general position of the tube sheet 14 is determined, its specific orientation under each circumstance is variable and random within limits.

For permanent operation the shell flange 8 is fastened to a companion flange on a dome end (not shown) which completes the closure of the shell 6 and encompasses the tube sheet 14 even though it is outstanding from or projects beyond the shell flange 8. For present purposes the dome end closure is omitted.

Pursuant to the invention there is provided a cylindrical testing ring 21 preferably fabricated of material similar to that of the shell 6. The cylindrical ring 21 or annulus has at its axially inner end that is, the end adjacent to the shell 6, an outstanding axially inner flange 22 approximately complementary to the shell flange 8. The axially inner flange 22 is welded or otherwise secured to the ring 21 and is provided with one or more lifting lugs 23 for ready positioning and handling. The axially inner flange 22 terminates in a radially inner face 24 normal to the axis 7 and a similar but not co-planar radially outer face 26 likewise normal to the axis 7.

Between the faces 24 and 26 the flange 22 is contoured to afford a gasket groove 28. The outer cylindrical boundary of the groove is in substantial alignment with the annular shoulder 12. Disposed partially within the groove 28 is an axially inner gasket 31 substantially square in cross section and fitting within the groove either by tight frictional engagement or held therein by an adhesive, or both. The gasket 31 is of deformable and flexible material and when the flanges 8 and 22 are placed in close juxtaposition the gasket 31 is compressed into the groove 28 and is partly embraced by the shoulder 12, being in abutment also with the face 9. Axially extending, circumferentially arranged fastening bolts 32 are passed through the shell flange 8 and the axially inner flange 22. When the two flanges are drawn toward each other, there is a resulting deformation of the gasket 31 to provide a pre-loaded pressure seal. The gasket 31 is intruded slightly into the space between the face 9 and the face 24. Increase in internal fluid pressure tends to reduce the intrusion and make tighter the abutment of the gasket and the flanges and so ensures that a leakproof joint is effectuated.

At its outboard or axially outer end, the cylindrical ring 21 is provided with radially inwardly extending axially outer flange 41 having an internal cylindrical surface 42 somewhat larger in diameter than the external cylindrical surface 16 of the tube sheet. Within the cylindrical ring 21 there is defined an interior cylindrical surface 43, substantially a continuation of the interior surface 44 of the shell 6. The surface 43 at a convenient point merges with an initial conical surface 46 substantially co-axial with the axis 7 and diminishing in diameter as the axially outermost portion of the ring 21 is approached. The initial conical surface 46 terminates in an intermediate cylindrical surface 47 co-axial with the axis 7. This surface 47 in turn merges with a final conical surface 48 concentric with the axis 7 and smaller in diameter than the initial conical surface 46. A shoulder surface 49 connects the final conical surface 48 with the internal cylindrical surface 42, the shoulder surface 49 being normal to the axis 7.

Pursuant to the invention, there is provided an axially outer gasket 51 preferably made of rubber-like deformable and resilient material with or without fabric reinforcement. The axially outer gasket 51 is an annulus having a circular-cylindrical interior face 52 and having a planar end face 53 normal to the axis 7. The axially outer gasket also is in part defined by a conical surface 54 intended substantially to match the surface 48. Also within the contour of the inner gasket is an interior rim wing 56 which together with an exterior rim wing 57 defines a re-entrant V-shaped groove 58. The dimensions of the axially outer gasket 51 are such that when standing free the surface 54 and the surface of the wing 57 merge in a rim edge having a diameter slightly larger than the diameter of the intermediate cylindrical surface 47.

In the use of this device, the heat exchanger shell 6 is disposed (as shown in the figures) without any dome end cover and with the tube sheet 14 and the tubes outstanding therefrom. A separate axially outer gasket 51 is first positioned on the tube sheet 14 in substantially the orientation shown with the re-entrant V-shaped groove 58 exposed to the axially inward side of the tube sheet. The fit of the gasket 51 on the tube sheet 14 is such that no gap is left therebetween yet the gasket 51 can be urged into position by movement substantially normal to the axis 7 without undue difficulty.

After the axially outer gasket 51 has been so positioned, the cylindrical testing ring 21 with the axially inner gasket 31 firmly fixed in position on the flange 22 is brought into co-axial relationship with the shell 6 so that the flanges 8 and 22 face each other. The cylindrical ring 21 is axially moved over the tube sheet 14, the initial conical surface 46 acting as a guide in overriding the axially outer gasket 51 and insuring that the parts are substantially central and easily telescoped. Further movement of the cylindrical ring 21 causes the intermediate cylindrical portion 47 to override the radially outermost rim of the gasket 51 (as shown in Figure 2) and causes a deflection or deformation of this portion of the gasket toward the center. There is thus produced a firm frictional engagement and no gap between the parts.

Fastening bolts 32 are positioned and are drawn up so that the gasket 31 is displaced to effectuate a firm and tight seal. Finally, the last axially inward movement of the cylindrical ring 21 toward the shell 6 brings the parts through the position shown in Figure 3 and substantially into the position shown in Figure 1 in which the radially outer conical surface 54 of the gasket abuts the final conical surface 48 of the cylindrical ring.

Under some circumstances the tube sheet 14 is provided with through passages 61 not occupied or otherwise closed. Any of these which may exist are preliminarily closed by rubber-like plugs 59.

When the positioning of the testing ring 21 has been accomplished, the interior of the shell 6 is subjected to hydraulic fluid under pressure. The pressure may deform the gasket 31 into a tighter seal. The pressure also is effective on the surfaces of the V-shaped groove 58, pressing one of them radially outwardly against the cylindrical ring 21, particularly against the cylindrical surface 47 thereof, and pressing the other one of them radially inwardly against the cylindrical surface 16 of the tube sheet.

There is preferably left sufficient room or clearance 62 behind the gasket 51, as shown in Figure 3 so that deformation of the gasket by reason of the testing fluid pressure exerted upon it causes the gasket to wedge into and occupy the clearance space 62 and so finally to rest against the face 49. Increase in fluid pressure merely serves more tightly to seal the gasket against its encompassing surfaces. The fluid pressure can be raised to a very high value.

Large increase in fluid pressure has the effect of substantially displacing the tube sheet 14 to the left along the axis 7 and sometimes to produce other more or less random distortions in the position of the tube sheet. The gasket 51 is sufficiently flexible or slidable to accommodate all of these movements whether axially, transversely in a radial direction or rotationally.

In the event there are any tube leaks, i.e., either test fluid leaks from the interior of the shell 6 into the otherwise dry tubes 13 or of the test fluid escaping from the interior of the shell 6 between the tubes 13 and the tube sheet 14, they are readily observable by an observer at the left end (Figure 1) of the structure since the ends of all the tubes 13 can be discerned at the exterior face of the tube sheet. These leaks can be noted for subsequent repair. At the conclusion of the tests the pressure fluid is released from the shell 6 and the fastenings 32 are removed. It is then simple, using the lifting lugs 23 if necessary, to remove the cylindrical ring 21 by axial translation to the left in Figure 1 leaving the gasket 51 behind on the tube sheet 14. The gasket itself is finally withdrawn separately and is either nested with the withdrawn ring 27 or is otherwise stored. The test unit is then ready for new tests under other circumstances even though the dimensions of the new parts may vary somewhat from those previously tested. In general there is provided an improved test jig fulfilling all of the objects of the invention.

What is claimed is:

1. A heat exchanger test jig for use with a heat exchanger having a shell flange and a cylindrical tube sheet outstanding therefrom comprising a cylindrical ring, an axially inner flange at one end of said ring, an axially inner gasket seated in said axially inner flange, means for holding said ring with said axially inner gasket abutting said shell flange, an axially outer flange at the other end of said ring having an interior cylindrical surface adapted to surround said tube sheet, means defining a conical surface inside said ring adjacent said axially outer flange, and an axially outer gasket having a pair of rim wings, said axially outer gasket being seated on said conical surface and on said tube sheet with the surface of said gasket between said rim wings being exposed to pressure within said ring and with one of said rim wings abutting said ring and the other of said rim wings abutting said tube sheet.

2. A heat exchanger test jig for use with a heat exchanger having a shell flange and a cylindrical tube sheet outstanding therefrom comprising a cylindrical ring; an axially inner flange at one end of said ring; said axially inner flange having a groove therein; an axially inner gasket seated in said groove in said axially inner flange; means for fastening said axially inner flange to said shell flange with said axially inner gasket abutting said shell flange; an axially outer flange at the other end of said ring; means defining an initial conical surface, a final conical surface and an intermediate cylindrical surface inside said ring adjacent said axially outer flange; and an axially outer gasket having an interior rim wing seated on said tube sheet and an exterior rim wing smaller than said initial conical surface and seated on said final conical surface and deformed against said intermediate cylindrical surface.

3. A heat exchanger test jig comprising a cylindrical ring, an axially inner out-turned flange on one end of said cylindrical ring and having a gasket groove in a normal face thereof, and an axially outer in-turned flange on the other end of said cylindrical ring, said in-turned flange having an interior circular cylindrical surface and said cylindrical ring defining a pair of internal conical surfaces spaced by an intervening cylindrical surface and terminated at a normal surface on said inturned flange adjacent said circular cylindrical surface.

4. A heat exchanger test jig for a heat exchanger having axially extending tubes, a shell flange surrounding said tubes and a cylindrical tube sheet engaging said tubes and axially spaced from said flange comprising a cylindrical ring adapted to encompass said tubes, an outturned axially inner flange at one end of said ring in facing relationship with said shell flange, means for connecting said outturned axially inner flange and said shell flange, an inturned axially outer flange at the other end of said ring in encompassing relationship with said tube sheet, an axially outer gasket having a planar radial end face adapted to abut the inside radial surface of said inturned axially outer flange, an interior rim wing on said gasket extending in a direction away from said inturned flange and when unstressed being in sliding contact with said tube sheet, and an exterior rim wing on said gasket extending in a direction away from said inturned flange and in contact with said ring, said interior rim wing and said exterior rim wing being spaced apart on the side of said gasket away from said inturned flange and in said spaced apart portion in position to be exposed to fluid pressure exerted within said ring and on the outside of said tubes.

References Cited in the file of this patent
UNITED STATES PATENTS

| | | |
|---|---|---|
| 1,596,394 | Braun | Aug. 17, 1926 |
| 1,856,618 | Brown | May 3, 1932 |
| 2,209,235 | Nathan | July 23, 1940 |
| 2,259,940 | Nathan | Oct. 21, 1941 |
| 2,517,921 | Phares | Aug. 8, 1950 |
| 2,579,972 | Scheiwer | Dec. 25, 1951 |
| 2,830,830 | Jacobs | Apr. 15, 1958 |